Figure 2:
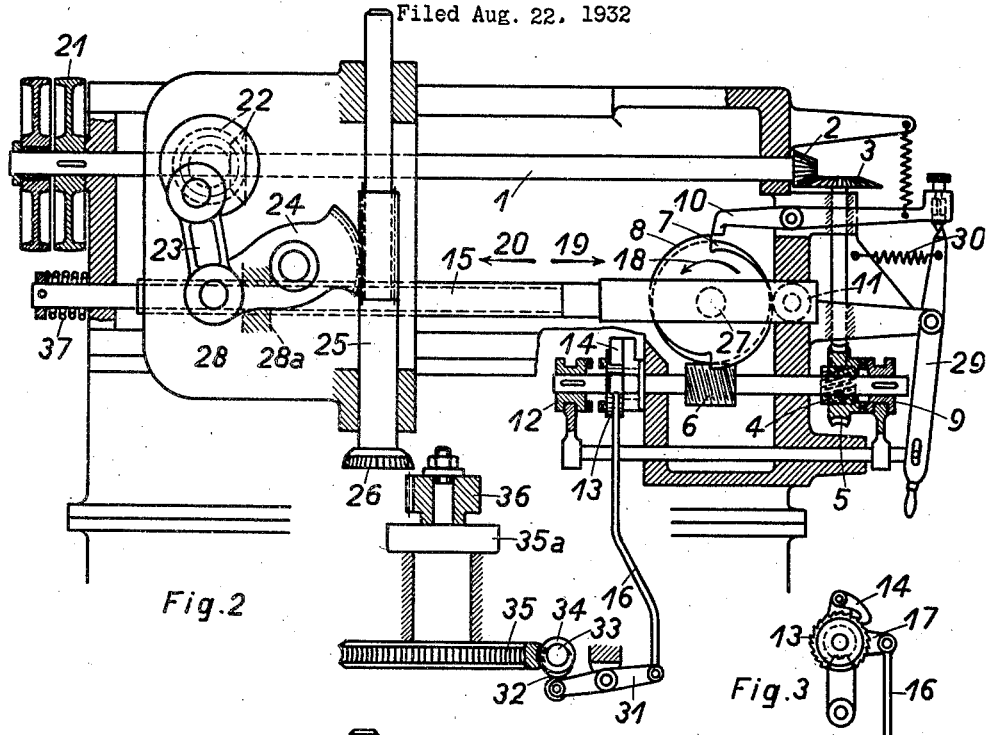

June 5, 1934.　　W. SCHMITT ET AL　　1,961,396
GEAR CUTTING MACHINE
Filed Aug. 22, 1932

INVENTORS:
Wilhelm Schmitt
Gebhardt Rothe

Patented June 5, 1934

1,961,396

UNITED STATES PATENT OFFICE 1,961,396

GEAR CUTTING MACHINE

Wilhelm Schmitt and Gerhard Rothe,
Ettlingen, Germany

Application August 22, 1932, Serial No. 629,848
In Germany August 29, 1931

3 Claims. (Cl. 90—9)

The invention relates to the feeding and changing apparatus on gear cutting machines that operate by the rolling method (Fellows system). In the known apparatus of this type a continuously rotating cam is employed for first setting to the depth of the teeth the reciprocating slide which carries the cutter spindle fitted with the vertically reciprocating cutting knife, while the cutting knife and the wheel body are caused to roll along one another, whereupon the cutting knife and the wheel body continue to roll until the wheel body has made one rotation and a complete set of teeth has been cut. The use of cams has the great advantage that by means of these simple organs the reciprocating slide can be conveniently changed in regard to depth of cut, and after the wheel has been set exactly, the cutting knife can at once be withdrawn from the space between the teeth, and the machine can be stopped. Furthermore, the cam may be, in known manner, so constructed that at first the setting to depth may be followed by a roughing cut, then a second setting to depth followed by a finishing cut, and finally the withdrawal of the reciprocating slide and the stopping of the machine.

In known types of machines the cam rotates at a constant speed, so that one rotation of the wheel body to be cut is equal to the cylindrical division of the feed curve while the other part of the cam is utilized for setting to depth and is shaped accordingly. Let it be supposed, for example, that a wheel is to be cut with 12 teeth and a second wheel with 120 teeth of equal pitch. The cam is a one-cut curve, that is to say the wheel teeth are cut with one rotation of the wheel body after the depth of tooth has been reached. One-fourth part of the cam is cylindrical, and one quarter of a rotation of the cam corresponds to one rotation of the wheel body; a further fourth part of the cam is employed for depth feeding. As one quarter of a rotation of the cam is equal to one rotation of the wheel body, the depth feed will be divided up over twelve teeth of the cutting knife in the case of the wheel with twelve teeth, while in the case of the wheel with 120 teeth the change to depth is only obtained with 120 teeth, that is to say, where the width of tooth, pitch and material is the same, takes ten times as long. If the cutting knife is one that will stand up to changing to depth for 12 teeth, without losing its cutting capacity, the change to depth, even for a wheel body having 120 teeth, should be finished with twelve teeth. If it be assumed that twelve teeth need 6 minutes for changing to depth, the wheel with 120 teeth needs 60 minutes, although the quality of the knife would allow a cutting capacity of six minutes. Thus 54 minutes are lost. (On the other hand the cutting knife would be too highly strained in a wheel body having twelve teeth if the cutting knife still remained sharp after cutting 20 teeth).

According to the invention these disadvantages are avoided while the above said advantage of the cam is retained, and this is effected by providing the cam with two sets of driving apparatus working alternately. For changing to depth, the movement of the cam is made dependent upon the movement of the cutter spindle, that is to say for every movement of the cutter spindle there is a certain change to depth, no matter whether the wheel body being worked is large or small in diameter. After the change to depth this is stopped and the further rotation of the cam is carried out dependent upon the rotation of the wheel body.

Figure 3:
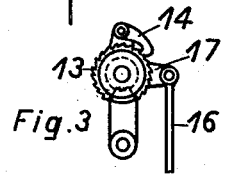
Figure 1:
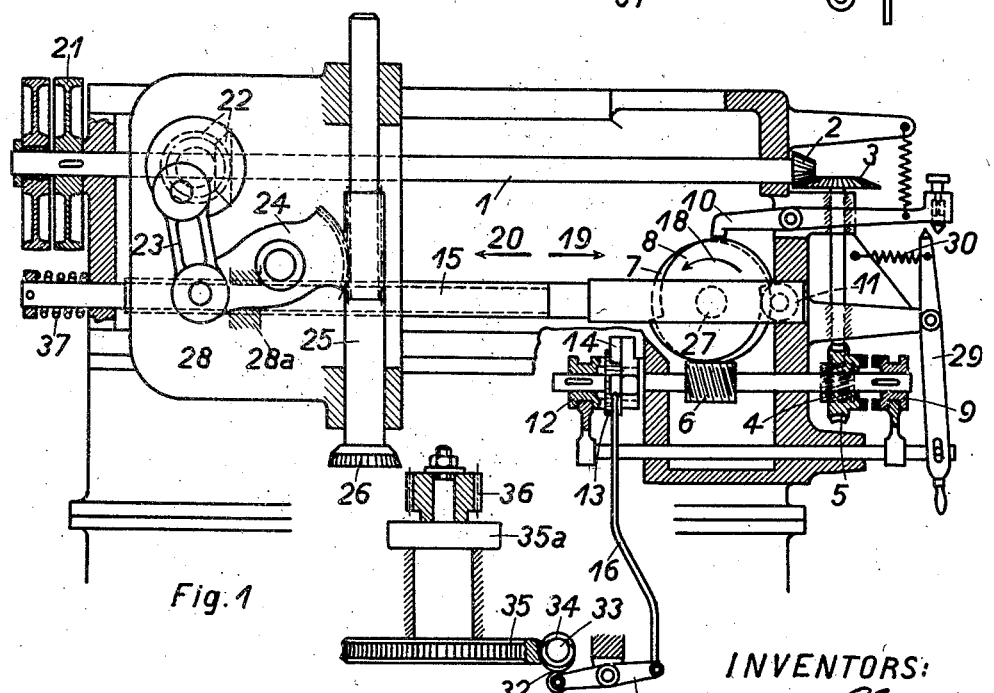

Figures 1 and 2 of the accompanying drawing illustrate apparatus according to the invention in two different positions, and Figure 3 shows detailed parts seen from a different direction.

In the drawing, the shaft 1, which is driven, for example, by means of the belt pulley 21, employs the bevel wheels 22, the link 23 and the segment 24 for operating the cutter spindle 25, which at its lower end carries the cutter 26. The speed of rotation of the shaft 1 is thus fixed in relation to the speed of reciprocation of the cutter spindle 25. By means of the bevel wheels 2 and 3, the worm 4 and the worm wheel 5, the shaft 1 also drives on to the worm 6, and this worm engages in the worm wheel 7, which is mounted on the same shaft 27 as the cam 8. To cause the worm 6 to be driven by the worm wheel 5, the clutch 9 is slipped into engagement by means of the hand lever 29 (Figure 2).

The cam 8 rotates, while the machine is running, in the direction indicated by the arrow 18, the lever 10 moving along in contact with the outer periphery of the cam. While the cam is rotating, the roller 11 is moved by the rising of the cam periphery in the direction indicated by the arrow 19 and pulls the control rod 15 in the same direction. This control rod is connected to the reciprocating slide 28 by means of the screw-threaded nut 28a. When the cam 8 has rotated so far as to allow the lever 10 to drop into the cavity in it (see Figure 2), the correct depth of tooth is reached; the lever 29 is released and the spring 30 disengages the clutch 9 and puts the clutch 12 into engagement (see Figure 1). The clutch 12 is driven, in the construction illustrated, by a ratchet wheel 13 and a pawl 14, the latter being moved by a rod 16 by means of the link 17 (Figure 3).

The rod 16 is moved by the lever 31, which is raised and lowered by an eccentric 32; this is secured to the spindle 33 of the worm 34, which engages in the toothed wheel 35. The mechanism driving the worm spindle 33 is not shown in the drawing, but the drive may be effected in any convenient manner. The dividing wheel 35 is connected to a table 35a, on which the wheel body 36 is clamped. The ratio of gearing between the dividing wheel 35 and the cam 8 is so determined that one rotation of the dividing wheel is equal to one-quarter of a single rotation of the cam 8. The reciprocating slide 28 remains unaffected in its place during this time, while the wheel body 36 is making a full rotation and the wheel is completely cut. During the further cutting, the cam 8 makes a further rotational movement; the reciprocating slide 28 is, however, drawn back by the spring 37 and there is no longer contact between the cutting knife 26 and the wheel body 36 for the reason that the roller 11 moves into the recess in the periphery of the cam 8.

If for the roller 11 there is substituted a correspondingly shaped cam, the slide 28 will move back suddenly; this retiring movement may be utilized for stopping the machine.

By changing the cam and making corresponding changes in the ratio of gearing, the teeth on a wheel can be completely cut only after it has made several rotations. The reciprocating slide may also be immovably mounted and the table for the wheel body may receive the corresponding lateral motion. By exchanging change wheels which may be provided in the gear for driving the cam shaft 27 during the depth feed by ones of another transmission ratio, the speed of rotation of said shaft during the depth feed and therewith also the speed of the depth feed can be varied without varying that of the rotational feed.

What we claim as our invention and desire to secure by Letters Patent is:

1. In a gear cutting machine of the reciprocating pinion cutter type the combination of a slide, a cutting spindle movably mounted in said slide, means for moving said cutting spindle, a rotatable work table, means for rotating said table, a rotatable cam for the depth feed of said slide and its retention in position, means for driving said cam during the depth feed in dependence upon the movement of said cutting spindle, means for driving said cam after the depth feed is finished in dependence upon the rotation of said work table, and means for automatically changing the drive of said cam after the depth feed.

2. In a gear cutting machine of the reciprocating pinion cutter type the combination of a slide, a cutting spindle movably mounted in said slide, means for moving said cutting spindle, a rotatable work table, means for rotating said table, a cam for the depth feed of said slide and its retention in position, a rotatable cam shaft carrying said cam, a gear for driving said shaft during the depth feed in dependence upon the movement of said cutting spindle, a second gear for driving said shaft after the depth feed in dependence upon the rotation of said work table, and means actuated by said cam shaft for uncoupling said cam shaft from the first said gear and for coupling it with said second gear after the depth feed is finished.

3. In a gear cutting machine of the reciprocating pinion cutter type the combination of a slide, a cutting spindle movably mounted in said slide, means for moving said cutting spindle, a rotatable work table, means for rotating said table, a cam for the depth feed of said slide and its retention in position, a rotatable cam shaft carrying said cam, a gear train for driving said shaft during the depth feed in dependence upon the movement of said cutting spindle, said gear train comprising wheels adapted to be exchanged by ones of another transmission ratio for the purpose of varying the speed of the depth feed, a second gear train for driving said shaft after the depth feed in dependence upon the rotation of said work table, and means actuated by said cam shaft for uncoupling the same from the first said gear train and for coupling it with said second gear train after the depth feed is finished.

WILHELM SCHMITT.
GERHARD ROTHE.